Patented Feb. 28, 1950

2,498,891

UNITED STATES PATENT OFFICE 2,498,891

PERHALOCYCLOHEXADIENES

Waldo B. Ligett, Detroit, Mich., and Earl T. McBee, La Fayette, and Vincent V. Lindgren, West Lafayette, Ind., assignors to Purdue Research Foundation, West Lafayette, Ind., a corporation of Indiana No Drawing. Application November 13, 1945, Serial No. 628,379

4 Claims. (Cl. 260—648)

This invention relates to a novel group of unsaturated alicyclic halocarbons, more particularly to perhalocyclohexadienes, and specifically to the chlorofluoro-cyclohexadienes.

Certain members of this class of compounds, especially those in which the —$CF_2$— group is present, are characterised by their stability in many chemical reactions. The —$CF_2$— group, being very stable, imparts desirable properties to the molecule of which it is a part. It is, therefore, among the objects of this invention to provide a new group of non-flammable halocarbons, certain members of which are stable compounds having utility as heat transfer media.

We have prepared representative members of this group of compounds and have determined certain of their physical constants whereby they may be identified. The compounds, in most cases, are colorless liquids. The lowest boiling member of this class, chloroheptafluorocyclohexadiene, boils at about 88 degrees centigrade, and other members boil at substantially higher temperatures depending upon their chlorine content. The compounds are insoluble in water, readily soluble in chlorofluoro compounds, and likewise soluble in common organic solvents such as alcohol and ether.

The compounds may be prepared by treating an appropriate unsaturated cyclic halocarbon with a fluorinating agent capable of saturating double bonds of the unsaturated nucleus in addition to replacing some of the chlorine atoms in the halocarbon. The reaction may be carried out, for example, in a step-wise manner, comprising successive treatment of an appropriate halogenated cyclic compound, e. g., hexachlorobenzene, first with bromine trifluoride and then with antimony pentafluoride. Antimony pentafluoride, in this instance, replaces any bromine which may have been introduced during the reaction with bromine trifluoride. The final product is subsequently dehalogenated and rectified to yield a perhalocyclohexadiene. Silver difluoride may also be used as a fluorinating agent, utilizing a brief contact period and a mild reaction temperature, the resulting product being dehalogenated and rectified.

The invention herein is not concerned with the process of manufacture or apparatus employed, but is concerned solely with the new group of compounds herein described and claimed. The following example illustrates a method by which members of this new group of compounds may be prepared, but is in no way to be construed as limiting the invention thereto.

The preparation of several of the members of the new class of compounds, perhalocyclohexadienes, was accomplished in the following manner: Bromine trifluoride (930 grams) was placed in a nickel tube 5.2 centimeters in diameter and 50 centimeters in length, closed at one end and cooled to zero degrees centigrade. Hexachlorobenzene was added to the bromine trifluoride in small quantities, with constant stirring. Stirring was accomplished by means of a motor-driven nickel rod inserted through the top of the tube and fitted with four blades, two inches apart on the rod. After each 100-gram quantity of hexachlorobenzene had been added, the tube was heated to 90 degrees centigrade, maintained at this temperature for about fifteen minutes, and then cooled to zero degrees centigrade. This prevented the accumulation and possible subsequent explosion or pyrolysis of unreacted starting materials. A total of 660 grams of hexachlorobenzene was added, representing a ratio of three moles of bromine trifluoride to one mole of hexachlorobenzene. The entire reaction mixture was heated to 150 degrees centigrade overnight.

The solid product which resulted was dissolved in a fluorochloro compound in a two-liter flask and heated to 63 degrees centigrade. Antimony pentafluoride (2.3 moles) was added drop-wise to the above solution over a period of three hours. The reaction mixture was then heated to 120 degrees centigrade and maintained at this temperature for a period of about eight hours, during which time bromine and part of the solvent were evolved from the reaction mixture. The product in solution was washed with hot concentrated hydrochloric acid to remove antimony salts.

After removal of the solvent, the solid product was dissolved in 500 milliliters of absolute ethanol. This solution was added over a six hour period to a refluxing suspension of 500 grams of zinc dust in ethanol. By elevation of the temperature, more volatile products were distilled from the mixture with some alcohol. The higher boiling constituents were removed by steam distillation. Alcohol was extracted from the accumulated products by washing with water. The mixture of organic products was rectified in a 100-plate Podbielniak column and yielded the following:

| Compound | B. P., °C. | Approximate Freezing point, °C. | R. I. at 20° C. | Density at 25° C. gm./ml. |
|---|---|---|---|---|
| Chloroheptafluorocyclohexadiene, $C_6ClF_7$ | 88–89 at 740 mm. Hg | −60 to −65 | 1.3560 | 1.633 |
| Dichlorohexafluorocyclohexadiene, $C_6Cl_2F_6$ | 119.0 to 120.0 at 750 mm. Hg | −25 to −30 | 1.4030 | 1.656 |
| Trichloropentafluorocyclohexadiene, $C_6Cl_3F_5$ | 156.0 to 157.0 at 750 mm. Hg | 0 to +5 | 1.4466 | 1.692 |

We claim:
1. A compound selected from the group consisting of (1) chloroheptafluorocyclohexadiene, $C_6ClF_7$, boiling at approximately 88–89 degrees centigrade at 740 millimeters of mercury pressure, (2) dichlorohexafluorocyclohexadiene, $C_6Cl_2F_6$, boiling at approximately 119–120 degrees centigrade at 750 millimeters of mercury pressure, and (3) trichloropentafluorocyclohexadiene, $C_6Cl_3F_5$, boiling at approximately 156–157 degrees centigrade at 750 millimeters of mercury pressure.

2. Chloroheptafluorocyclohexadiene, $C_6ClF_7$, boiling at approximately 88–89 degrees centigrade at 740 millimeters of mercury pressure.

3. Dichlorohexafluorocyclohexadiene, $C_6Cl_2F_6$, boiling at approximately 119–120 degrees centigrade at 750 millimeters of mercury pressure.

4. Trichloropentafluorocyclohexadiene, $C_6Cl_3F_5$, boiling at approximately 156–157 degrees centigrade at 750 millimeters of mercury pressure.

WALDO B. LIGETT.
EARL T. McBEE.
VINCENT V. LINDGREN.

REFERENCES CITED

The following references are of record in the file of this patent:

Barral: "Bull. Soc. Chim. de France," third series, vol. 13, pages 418–423 (1895).

Van der Linden: "Recueil des Trav. Chim. des Pays-Bas," vol. 55, pages 421–430 (1936).

Crossley et al.: "Jour. Chem. Soc.," (new series), vol. 83, pages 494 to 504 (1901).

Bigelow et al.: "J. Am. Chem. Soc.," vol. 56, pages 2773–2774 (1934).

Heme et al.: "J. Am. Chem. Soc.," vol. 67, pages 1235–1237 (Aug. 1945).